United States Patent
Rahman (10) Patent No.: US 11,621,982 B1
(45) Date of Patent: Apr. 4, 2023

(54) SEAMLESS VOICE CALL INITIATION (71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/384,583

(22) Filed: Jul. 23, 2021

(51) Int. Cl.
G06F 13/00 (2006.01)
H04L 65/1069 (2022.01)
H04W 24/10 (2009.01)
H04L 65/1016 (2022.01)
H04L 65/80 (2022.01)

(52) U.S. Cl.
CPC ...... H04L 65/1069 (2013.01); H04L 65/1016 (2013.01); H04L 65/80 (2013.01); H04W 24/10 (2013.01)

(58) Field of Classification Search
CPC . H04L 65/1069; H04L 65/1016; H04L 65/80; H04W 24/10
USPC ................................ 709/220–222, 227–229
See application file for complete search history.

(56) References Cited

U.S. PATENT DOCUMENTS

| | | | |
|---|---|---|---|
| 5,963,869 A | 10/1999 | Fehnel | |
| 6,738,373 B2 | 5/2004 | Turner | |
| 7,079,521 B2 | 7/2006 | Holur et al. | |
| 7,260,087 B2 | 8/2007 | Bao et al. | |
| 7,280,546 B1 | 10/2007 | Sharma et al. | |
| 7,330,453 B1 | 2/2008 | Borella et al. | |
| 7,940,730 B1 | 5/2011 | Mahler et al. | |
| 8,130,635 B2 | 3/2012 | Suvi et al. | |
| 8,817,600 B2 | 8/2014 | Payyappilly et al. | |

(Continued)

FOREIGN PATENT DOCUMENTS

| | | |
|---|---|---|
| CN | 100591175 C | 2/2010 |
| CN | 103493521 B | 2/2017 |

(Continued)

OTHER PUBLICATIONS

3rd Generation Partnership Project; Technical Specification Group Services and System Aspects; Procedures for the 5G System; Stage 2 (Release 16). 3GPP TS 23.502 V16.0.2 (Apr. 2019). Section 4.11.1.2.1 (pp. 156-160) and Section 4.13.6.1 (pp. 224-227).

(Continued)

Primary Examiner — Kenneth R Coulter
(74) Attorney, Agent, or Firm — Perkins Coie LLP (57) ABSTRACT Methods, devices, and system related to wireless communications are disclosed. In one example aspect, a method for wireless communication includes receiving, by a first access node in a first type of communication network, a request from a wireless device to establish a voice session with an Internet Protocol Multimedia System (IMS); initiating, by the first access node, an IMS voice session establishment for the wireless device; configuring, by the first access node, a Quality of Service (QoS) for the IMS voice session using a Protocol Data Unit (PDU) session modification request; and determining, in part based on one or more capabilities of the wireless device, to refrain from triggering a fallback to a second type of communication network for the IMS voice session establishment.

20 Claims, 6 Drawing Sheets (56) References Cited

U.S. PATENT DOCUMENTS

| | | | |
|---|---|---|---|
| 8,855,083 | B2 | 10/2014 | Aghvami et al. |
| 8,903,393 | B2 | 12/2014 | Payyappilly et al. |
| 8,982,840 | B2 | 3/2015 | Zisimopoulos et al. |
| 9,143,548 | B2 | 9/2015 | Foti |
| 9,271,255 | B1 | 2/2016 | Jones |
| 9,401,934 | B2 | 7/2016 | Sylvain |
| 9,763,148 | B2 | 9/2017 | Wong et al. |
| 9,807,819 | B1 | 10/2017 | Zhu et al. |
| 9,872,216 | B2 | 1/2018 | Aghvami et al. |
| 9,961,591 | B2 * | 5/2018 | Swaminathan ... H04W 36/0022 |
| 10,595,250 | B2 | 3/2020 | Keller et al. |
| 10,764,957 | B2 * | 9/2020 | Jha .................. H04W 76/27 |
| 11,310,700 | B2 * | 4/2022 | Kwok ................ H04W 36/30 |
| 2005/0249196 | A1 | 11/2005 | Ansari et al. |
| 2006/0291412 | A1 | 12/2006 | Naqvi et al. |
| 2007/0078986 | A1 | 4/2007 | Ethier et al. |
| 2007/0140218 | A1 | 6/2007 | Nair et al. |
| 2007/0243872 | A1 | 10/2007 | Gallagher et al. |
| 2009/0168766 | A1 | 7/2009 | Eyuboglu et al. |
| 2011/0039562 | A1 | 2/2011 | Balasubramanian et al. |
| 2011/0122783 | A1 | 5/2011 | Lin et al. |
| 2012/0224564 | A1 | 9/2012 | Paisal et al. |
| 2013/0094446 | A1 | 4/2013 | Swaminathan |
| 2013/0142169 | A1 | 6/2013 | Kulakov et al. |
| 2014/0064156 | A1 | 3/2014 | Paladugu et al. |
| 2014/0328217 | A1 * | 11/2014 | Bollapragada ......... H04L 65/80 370/259 |
| 2017/0026938 | A1 | 1/2017 | Onggosanusi et al. |
| 2017/0176071 | A1 | 10/2017 | Xu et al. |
| 2018/0092085 | A1 | 3/2018 | Shaheen et al. |
| 2019/0053028 | A1 | 2/2019 | Chandramouli et al. |
| 2019/0174011 | A1 | 6/2019 | Jabara et al. |
| 2020/0015128 | A1 | 1/2020 | Stojanovski et al. |
| 2020/0022031 | A1 * | 1/2020 | Li ..................... H04W 36/385 |
| 2020/0068647 | A1 | 2/2020 | Jha et al. |
| 2020/0112887 | A1 * | 4/2020 | Kwok ................ H04L 65/1016 |
| 2022/0345949 | A1 * | 10/2022 | Youn ................... H04W 36/32 |

FOREIGN PATENT DOCUMENTS

| | | |
|---|---|---|
| CN | 104038974 B | 3/2017 |
| CN | 104081741 B | 4/2018 |
| CN | 104335544 B | 5/2018 |
| CN | 103997485 B | 6/2018 |
| CN | 107466114 B | 6/2020 |
| CN | 106797594 B | 7/2020 |
| CN | 109548093 B | 2/2021 |
| DE | 10297190 B4 | 12/2011 |
| EP | 1670273 A1 | 6/2006 |
| EP | 1980070 B1 | 5/2014 |
| EP | 1880559 B1 | 8/2015 |
| EP | 1751923 B1 | 5/2017 |
| EP | 2314103 B1 | 3/2018 |
| EP | 1973368 B1 | 9/2018 |
| EP | 2689578 B1 | 1/2019 |
| EP | 3780757 A1 | 2/2021 |
| JP | 4921551 B2 | 2/2012 |
| JP | 5119243 B2 | 10/2012 |
| KR | 100954616 B1 | 4/2010 |
| KR | 101148036 B1 | 6/2012 |
| KR | 101163258 B1 | 7/2012 |
| KR | 101565626 B1 | 11/2015 |
| WO | 9916266 A1 | 4/1999 |
| WO | 2005064962 A1 | 7/2005 |
| WO | 2006040673 A2 | 4/2006 |
| WO | 2007140834 A1 | 12/2007 |
| WO | 2009006079 A1 | 1/2009 |
| WO | 2011056046 A2 | 5/2011 |
| WO | 2015003153 A1 | 1/2015 |
| WO | 2018230603 A1 | 12/2018 |
| WO | 2021049841 A1 | 3/2021 |

OTHER PUBLICATIONS

Ericsson et al. "EPS Fallback for voice further enhancements" S2-181692, 3GPP TSG-SA WG2 Meeting #126, Montreal, Canada. Feb. 20, 2018, 10 pages.
Ericsson et al. "EPS Fallback for voice" S2-181636, 3GPP TSG-SA WG2 Meeting #126, Montreal, Canada. Mar. 13, 2018, 2 pages.
Ericsson et al. "EPS Fallback for voice" S2-181637, 3GPP TSG-SA WG2 Meeting #126, Montreal, Canada. Feb. 20, 2018, 10 pages.
International Searching Authority, International Search Report and Written Opinion, PCT Patent Application PCT/US2020/026265, dated Jul. 17, 2020, 10 pages.
ZTE. "Clarification and alignment on the NG-RAN behavior for EPS/RAT fallback," S2-181829, 3GPP TSG-SA WG2 Meeting #126, Montreal, Canada, Feb. 20, 2018, 2 pages.
3rd Generation Partnership Project; Technical Specification Group Services and System Aspects; Procedures for the 5G System; Stage 2 (Release 17). 3GPP TS 23.502 V17.1.0, Jun. 24, 2021. Section 4.11.1.3.1, 4.13.6.1-4.13.6.2; and figure 4.13.6.1-1, 692 pages.
International Searching Authority, International Search Report and Written Opinion, PCT Patent Application PCT/US2022/038085, dated Nov. 1, 2022, 11 pages.

* cited by examiner

SEAMLESS VOICE CALL INITIATION

BACKGROUND

Voice over New Radio (VoNR) is a voice calling service that uses the 5G network for its source of Internet Protocol (IP) voice processing. Similar to Voice over Long-Term Evolution (VoLTE), VoNR is based on the IP Multimedia System (IMS) according to the Third-Generation Partnership Project (3GPP) standard.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

While using 5G/NR technology for both voice and data communications is the ultimate goal of 5G adoption, most network operators have assumed a phased approach for 5G deployments. Various 5G deployment options and timelines for readiness of network components and devices have led to an interim option of using Evolved Universal Terrestrial Radio Access (E-UTRAN) for voice service. The Long-Term-Evolution (LTE) Evolved Packet System (EPS) is one of the deployment scenarios that support redirection and/or handover to E-UTRAN during the call setup phase, referred to as the EPS fallback.

Due to the different network characteristics between the 5G/NR networks and the LTE networks, preferences can be given to the LTE networks for handling IMS voice calling. For example, LTE networks often have larger coverage areas, enabling stable voice calls when the users are on the move. However, the call signal strength and quality provided by the 5G/NR networks often surpass those of the LTE networks. This document discloses techniques that enable the network to refrain from triggering the EPS fallback, e.g., based on UE capabilities, thereby reducing setup delays during voice session establishment and providing better call quality and strength to users using the 5G/NR communication technology. The disclosed techniques also allow proper handover to the E-UTRAN when the call signal deteriorates after the voice call session is established.

Wireless Communications System

Figure 1:
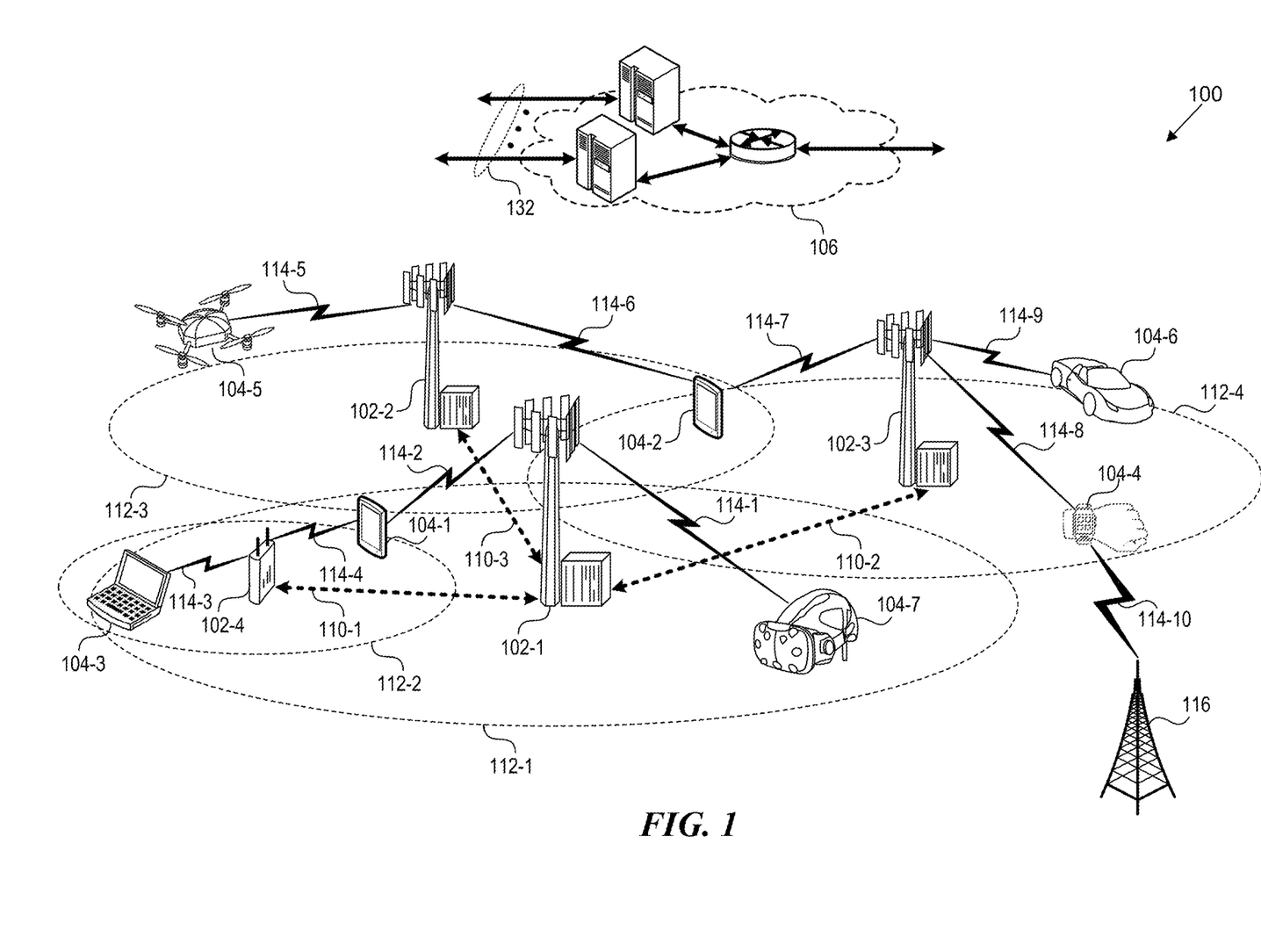
FIG. 1 is a block diagram that illustrates a wireless communications system.

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE) /LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-toeverything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Refrain from EPS Fallback

Figure 2:
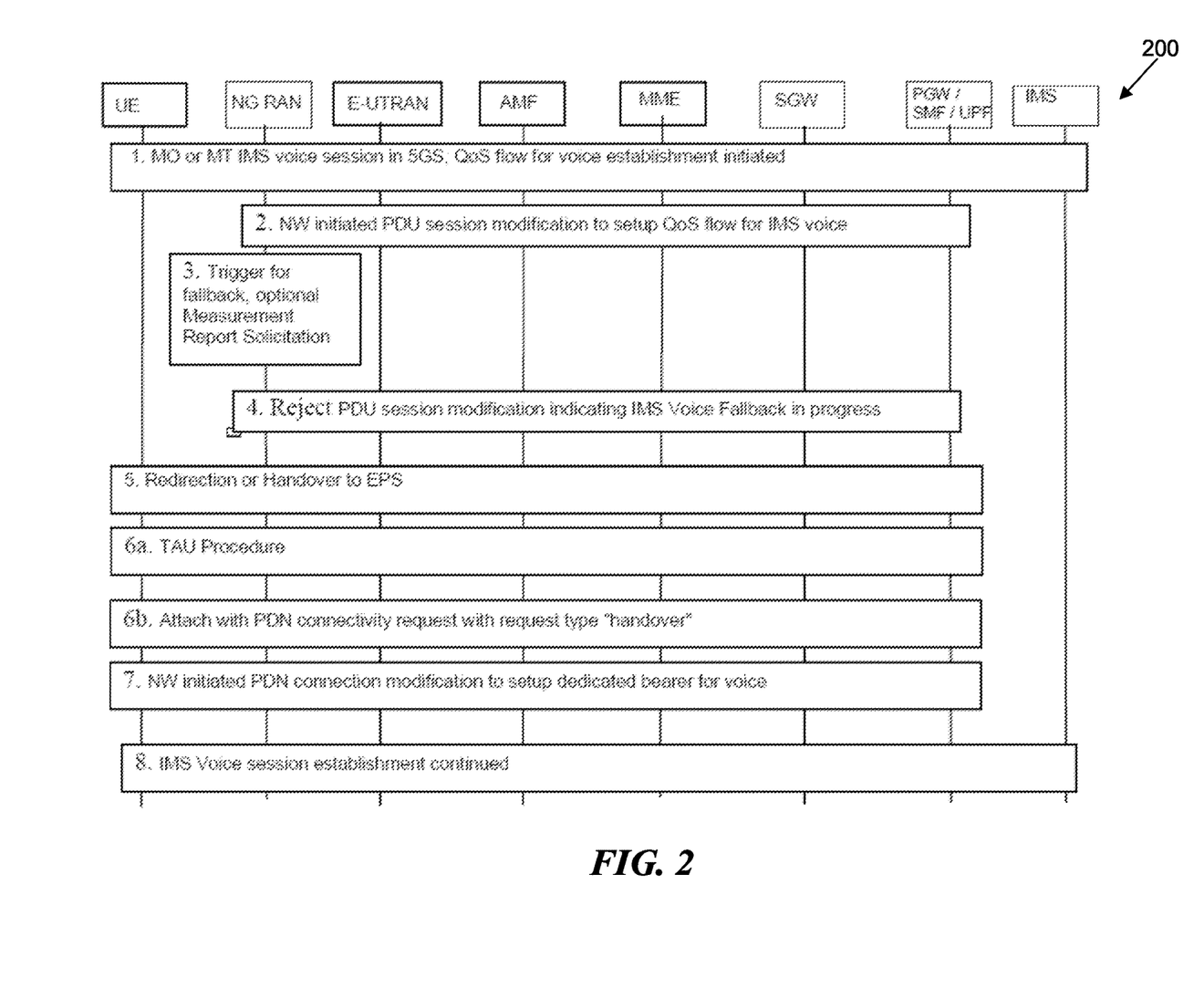
FIG. 2 illustrates an example Evolved Packet System (EPS) fallback procedure for IMS voice defined in current 3GPP standard.

The EPS fallback refers to the deployment scenario in which the EPS supports redirection and/or handover from the 5G Radio Access Network (NG-RAN) to E-UTRAN during the call setup phase. The EPS fallback mechanism leverages the existing IMS Core and EPS for delivering voice or video services. As the EPS fallback relies on the E-UTRAN and the existing IMS core network for voice/video services, the customer experience is the same as VoLTE except with call setup delays that are incurred as a result of the redirection/handover to the E-UTRAN. FIG. 2 illustrates an example EPS fallback procedure 200 for IMS voice defined in current 3GPP standard.

Operation 1: The User Equipment (UE) camps on the NG-RAN. An IMS voice session establishment has been initiated.

Operation 2: The network initiates Protocol Data Unit (PDU) Session modification to setup Quality of Service (QoS) flow for IMS voice.

Operation 3: The NG-RAN is configured to support EPS fallback for IMS voice and decides to trigger fallback to EPS, taking into account UE capabilities, indication that redirection for EPS fallback for voice is possible, network configuration, and/or radio conditions. The NG-RAN can optionally initiate measurement report solicitation from the UE including E-UTRAN as target.

Operation 4: The NG-RAN responds indicating rejection of the PDU Session modification to setup QoS flow for IMS voice received in Operation 2 by PDU Session Response message towards the Packet Data Network Gateway of Control Plane and the Session Management Function (PGW-C+SMF), or Home SMF with PGW-C via Visited SMF in case of roaming scenario, via the Access and Mobility Management Function (AMF) with an indication that mobility due to fallback for IMS voice is ongoing.

Operation 5. NG-RAN initiates either handover or Access Network (AN) Release via inter-system redirection to EPS, taking into account UE capabilities.

Operation 6: When the UE is connected to EPS:

6a. In the case of 5GS to EPS handover and in the case of inter-system redirection to EPS with N26 interface, the UE initiates the Tracking Area Update (TAU) procedure; or 6b. In the case of inter-system redirection to EPS without N26 interface, if the UE supports Request Type flag "handover" for PDN connectivity request during the attach procedure and has received the indication that interworking without N26 is supported, then the UE initiates Attach with PDN connectivity request with request type "handover".

Operation 7: After completion of the mobility procedure to EPS, the SMF/PGW re-initiates the setup of the dedicated bearer for IMS voice.

Operation 8: The IMS voice session establishment is continued.

As indicated in Operation 3, the decision to trigger the EPS fallback can be based on the radio conditions using the measurement reports transmitted from the UE. To avoid back and forth handover between the two networks, the 3GPP also specifies that at least for the duration of the voice call in EPS, the E-UTRAN is configured to not trigger any handover back to 5GS. However, while the LET network can provide larger coverage areas than the current 5G networks, the signal strength and/or quality of the 5G networks often surpass the LTE networks. Thus, the EPS fallback can be erroneously triggered, leading to unnecessary call setup delays and worse call quality without the opportunity to switch back to the 5G network.

This patent document discloses techniques that can be implemented in various embodiments to improve the EPS fallback procedure so as to provide better call quality to users with devices capable of both 5G and LTE communication technologies. In particular, given that the UE supports the 5G technology, the network can be configured to refrain from the EPS fallback during the initiation of the IMS voice session establishment to avoid the additional call setup delays. Once the call session is established, the network can determine, based on factors such as coverage levels, user mobility patterns, and network conditions, whether a handover of the voice call to the LTE network is necessary.

Figure 3:
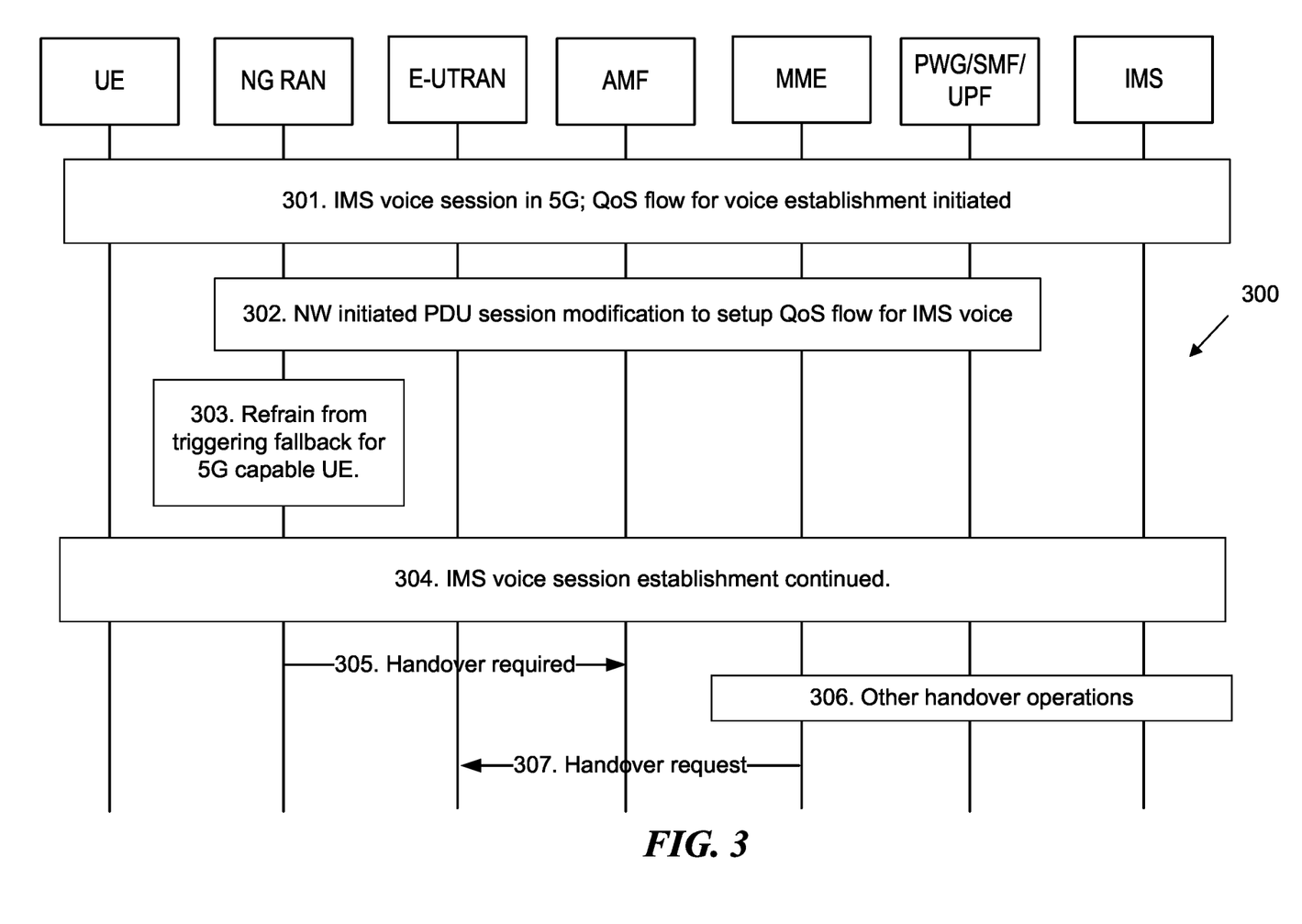
FIG. 3 illustrates an example procedure for initiating IMS voice establishment in accordance with one or more embodiments of the present technology.

FIG. 3 illustrates an example procedure 300 for initiating an IMS voice establishment in accordance with one or more embodiments of the present technology.

Operation 301: The User Equipment (UE) camps on NG-RAN. An IMS voice session establishment has been initiated.

Operation 302: The network initiates Protocol Data Unit (PDU) Session modification to setup Quality of Service (QoS) flow for IMS voice.

Operation 303: The NG-RAN examines UE's capabilities and determines that the UE can support 5G communications. Thus, even when EPS fallback for voice is possible, the NG-RAN decides to refrain from triggering EPS fallback for this UE. In some embodiments, the NG-RAN can consider the coverage areas of the NG-RAN and/or E-UTRAN, as well as the network measurement reports of both NG-RAN and/or E-UTRAN, to decide whether it should refrain from triggering EPS fallback. For example, the NG-RAN can examine the Reference Signal Received Power(RSRP) and Reference Signal Received Quality (RSRQ) reported by the UE and determine that the 5G network conditions are sufficient to support the IMS voice session even though these results may not be superior to the measurement results associated with the E-UTRAN. In some embodiments, the NG-RAN can compare the RSRP with a predetermined threshold and determine whether the network conditions are suitable. For example, an RSRP value of 116 dBm or better is often considered acceptable for a voice call. If the RSRP value gets below 116 dBm, the voice call can suffer from poor speech quality, and the user can experience various issues such as garbled voice, audio mute, call setup failure and/or call drop. In some embodiments, using advanced codecs, such as Enhanced Voice Services (EVS), Adaptive Multi-Rate Wide Band (AMR-WB), and/or Adaptive Multi-Rate Narrow Band (AMR-NB), the NG-RAN can decide to refrain from triggering EPS fallback given that the RSRP value is within an offset range from the predetermined threshold. For example, if the RSRP value is within a margin of −2 dBm from the threshold (e.g., 116 dBm), the NG-RAN decides to not trigger EPS fallback.

Operation 304: The IMS voice session establishment continues in NG-RAN.

Once the IMS voice session establishment is complete, the user equipment can perform the voice call using VoNR. When the 5G network conditions become unsatisfactory (e.g., caused by UE mobility from the 5G network towards the LTE network, or other types of changes), a system interworking procedure between the EPS and the 5GS can be performed. For example, the NG-RAN decides, at operation 305, that the UE should be handed over to the E-UTRAN. The other network functions perform relevant operations at Operation 306 to facilitate the handover from 5GS to EPC. At Operation 306, the E-TRAN receives a handover request from the Mobility Management Entity (MME) to continue the handover procedure. Such handover procedure can be the same as the N26 interface based handover or S1-based handover as specified in the 3GPP standard TS 23.602 and/or TS 23.401.

Figure 4:
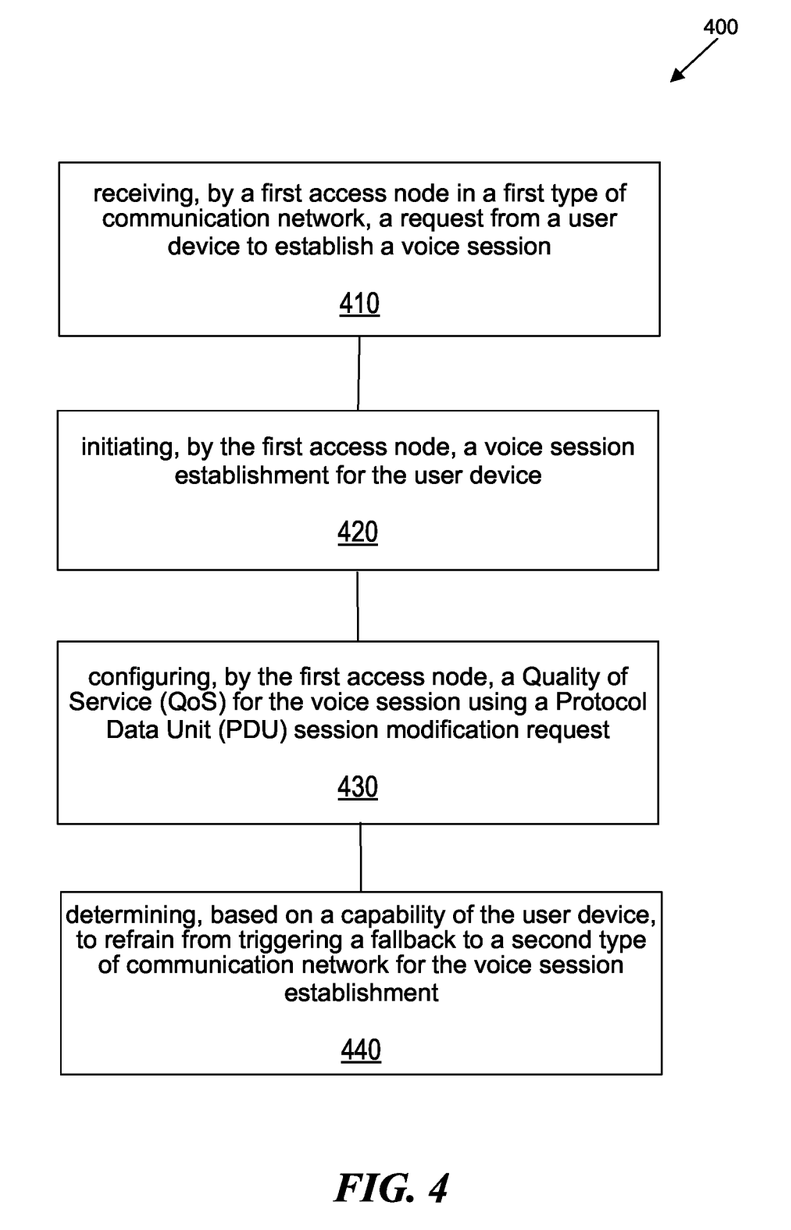
FIG. 4 is a flow chart representation of a method for wireless communication in accordance with one or more embodiments of the present technology.

FIG. 4 is a flowchart representation of a method 400 for wireless communication in accordance with one or more embodiments of the present technology. The method 400 includes, at operation 410, receiving, by a first access node in a first type of communication network, a request from a wireless device to establish a voice session with an Internet Protocol Multimedia System (IMS). The method 400 includes, at operation 420, initiating, by the first access node, an IMS voice session establishment for the wireless device. The method 400 includes, at operation 430, configuring, by the first access node, a Quality of Service (QoS) for the IMS voice session using a Protocol Data Unit (PDU) session modification request. The method also includes, at operation 440, determining, in part based on a capability of the wireless device, to refrain from triggering a fallback to a second type of communication network for the IMS voice session establishment. It is noted that the method 400 is applicable to both non-roaming scenarios and roaming scenarios in which the wireless device request to establish the voice session with the visited public land mobile network (V-PLMN). For example, the first access node can be located in the V-PLMN to establish the voice session for the roaming wireless device.

In some embodiments, the method also includes determining, by the first access node after the voice session establishment is complete, that a handover procedure is required to handover the wireless device to a second access node of the second type of communication network. In some embodiments, the first type of communication network comprises a Fifth-Generation (5G) network. In some embodiments, the second type of communication network comprises a Long-Term-Evolution (LTE) network. In some embodiments, the capability of the wireless device indicates that the wireless device supports Fifth-Generation (5G) communication technology.

In some embodiments, the determining is further based on a coverage level of the first type of communication network and/or the second type of communication network. In some embodiments, the determining is further based on a network measurement of the first type of communication network and/or the second type of communication network.

Figure 5:
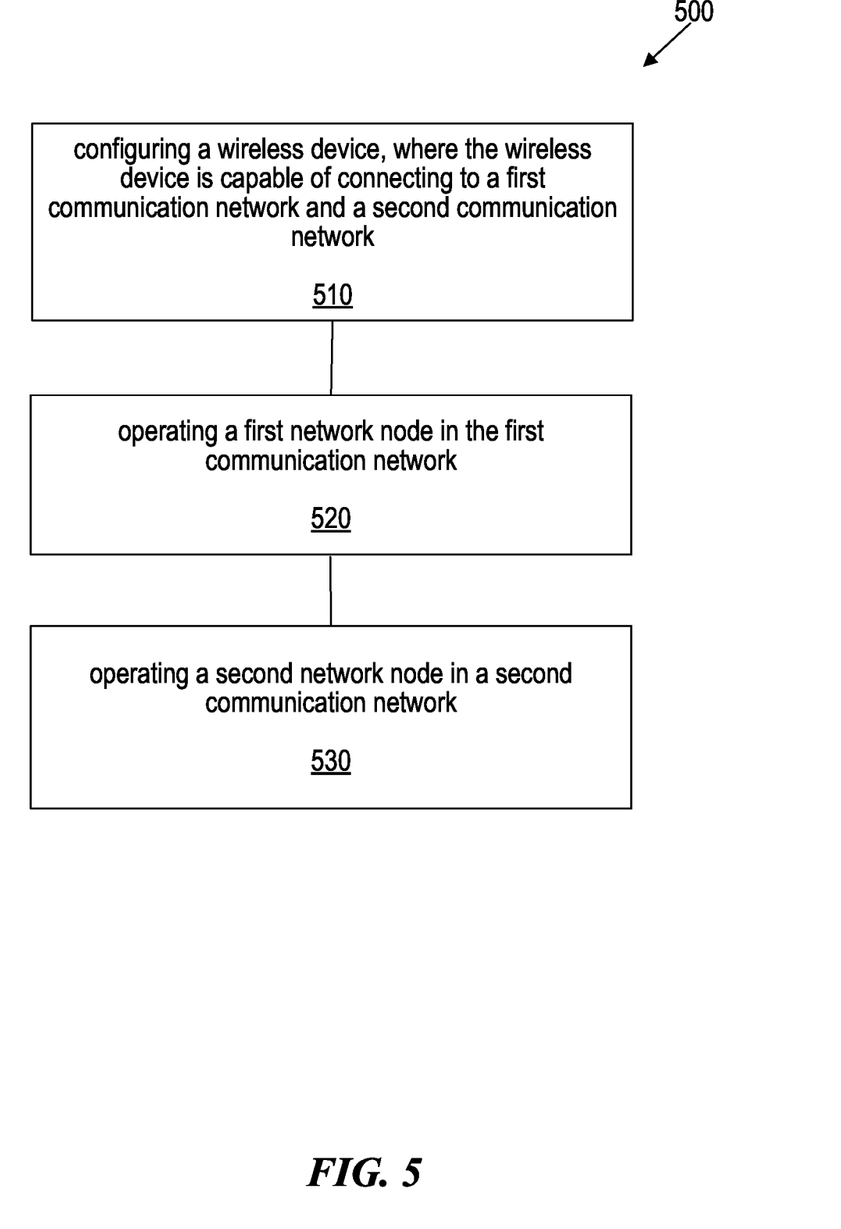
FIG. 5 is a flow chart representation of another method for wireless communication in accordance with one or more embodiments of the present technology.

FIG. 5 is a flowchart representation of a method 500 for wireless communication in accordance with one or more embodiments of the present technology. The method 500 includes, at operation 510, configuring a wireless device. For example, a wireless network carrier can configure a wireless device so that the wireless device can operate in one or more networks operated by the carrier. In some embodiments, the wireless device is capable of connecting to a first communication network (e.g., the LTE network) and a second communication network that is different than the first communication network (e.g., the 5G network). The method 500 includes at operation 520, operating a first network node in the first communication network. The method 500 also includes, at operation 530, operating a second network node in a second communication network. The second network node is configured to receive a request for establishing a call using an Internet Protocol (IP) Multimedia Subsystem (IMS) from the wireless device, initiate an IMS voice session establishment for the wireless device, configure a Quality of Service (QoS) for the IMS voice session establishment using a Protocol Data Unit (PDU) session modification request, and determine, in part based on a capability of the wireless device, to refrain from triggering a fallback to the first communication network for the IMS voice session establishment.

It is appreciated that, the techniques disclosed herein can be used to provide better call quality to users with devices capable of both 5G and LTE communication technologies and avoid/eliminate the unnecessary delays in voice call establishments, thereby improving 5G technology adoption in various scenarios under phased deployment of 5G networks.

Computer System

Figure 6:
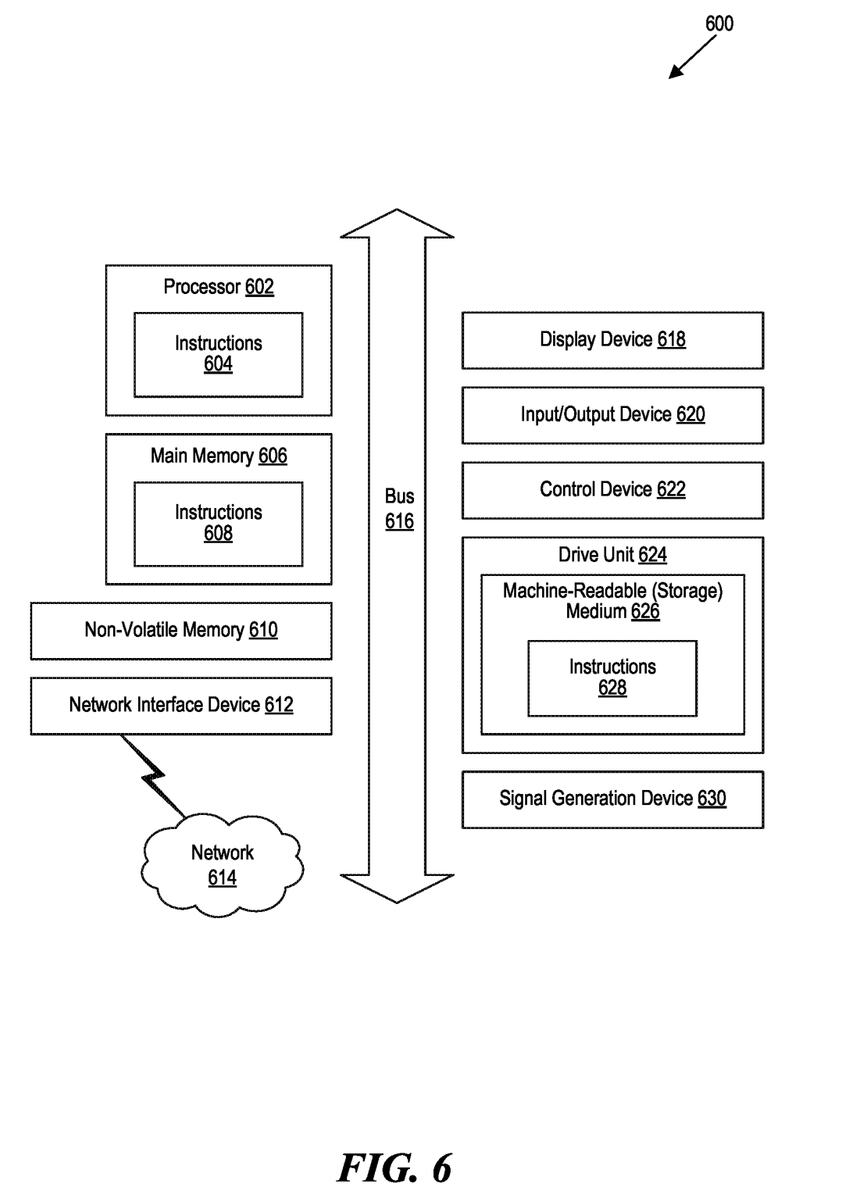
FIG. 6 is a block diagram that illustrates an example of a computer system in which at least some operations described herein can be implemented.

FIG. 6 is a block diagram that illustrates an example of a computer system 600 in which at least some operations described herein (e.g., as shown in FIG. 4 and FIG. 5) can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for wireless communication, comprising:
   receiving, by a first access node in a first type of communication network, a request from a wireless device to establish a voice session with an Internet Protocol Multimedia System (IMS);
   initiating, by the first access node, an IMS voice session establishment for the wireless device;

configuring, by the first access node, a Quality of Service (QoS) for the IMS voice session establishment using a Protocol Data Unit (PDU) session modification request; and determining, in part based on one or more capabilities of the wireless device, to refrain from triggering a fallback to a second type of communication network for the IMS voice session establishment, wherein the first type of communication network and the second type of communication network are different.

2. The method of claim 1, further comprising:

determining, by the first access node after the IMS voice session establishment is complete, that a handover procedure is required to handover the wireless device to a second access node of the second type of communication network.

3. The method of claim 1, wherein the first type of communication network comprises a Fifth-Generation (5G) network.

4. The method of claim 1, wherein the second type of communication network comprises a Long-Term-Evolution (LTE) network.

5. The method of claim 1, wherein the one or more capabilities of the wireless device indicates that the wireless device supports Fifth-Generation (5G) communication technology.

6. The method of claim 1, wherein the determining is further based on a coverage level of the first type of communication network, the second type of communication network, or both.

7. The method of claim 1, wherein the determining is further based on a network measurement of the first type of communication network, the second type of communication network, or both.

8. A device for wireless communication connected to a first core network, comprising a processor that is configured to:

receive a request from a wireless device to establish a voice session based on an Internet Protocol Multimedia System (IMS);

initiate the voice session establishment for the wireless device;

configure a Quality of Service (QoS) for the voice session using a Protocol Data Unit (PDU) session modification request; and determining, in part based on a capability of the wireless device, to refrain from triggering a fallback to a second core network for the voice session establishment, wherein the first core network and the second core network are different.

9. The device of claim 8, wherein the processor is configured to:

determine, after the voice session establishment is complete, that a handover procedure is required to handover the wireless device to a second device connected to the second core network.

10. The device of claim 8, wherein the first core network comprises a Fifth-Generation Core (5GC) network.

11. The device of claim 8, wherein the second core network comprises an Evolved Packet Core (EPC) network.

12. The device of claim 8, wherein the wireless device supports Fifth-Generation (5G) communication capabilities.

13. The device of claim 8, wherein the processor is configured to determine to refrain from triggering the fallback based on at least a coverage level of the first core network and/or the second core network or a network measurement of the first core network and/or the second core network.

14. The device of claim 13, wherein the network measurement comprises at least a Reference Signals Received Power (RSRP) or Reference Signal Received Quality (RSRQ) reported by the wireless device.

15. A method for operating one or more wireless communication networks, comprising:

configuring a wireless device, wherein the wireless device is capable of connecting to a first communication network and a second communication network that is different than the first communication network;

operating a first network node in the first communication network; and operating a second network node in the second communication network, wherein the second network node configured to:

receive a request for establishing a call using an Internet Protocol (IP) Multimedia Subsystem (IMS) from the wireless device;

initiate an IMS voice session establishment for the wireless device;

configure a Quality of Service (QoS) for the IMS voice session establishment using a Protocol Data Unit (PDU) session modification request; and determine, in part based on a capability of the wireless device, to refrain from triggering a fallback to the first communication network for the IMS voice session establishment.

16. The method of claim 15, wherein the first communication network comprises a Long-Term-Evolution (LTE) network, and wherein the first network node comprises an Evolved Universal Terrestrial Radio Access node in the LTE network.

17. The method of claim 15, wherein the second communication network comprises a Fifth-Generation (5G) network, and wherein the second network node comprises an access node of the 5G network.

18. The method of claim 15, wherein the wireless device supports Fifth-Generation (5G) communication capabilities.

19. The method of claim 15, wherein the second network node is configured to:

determine, after the IMS voice session establishment is complete, that a handover procedure is required to handover the wireless device to the first network node in the first communication network.

20. The method of claim 15, wherein the second network node is configured to determine to refrain from triggering the fallback based on at least a coverage level of the first communication network and/or the second communication network, or a network measurement of the first communication network and/or the second communication network.

* * * * *